United States Patent [19]

Bosshard

[11] 4,018,348

[45] Apr. 19, 1977

[54] APPARATUS FOR IRRADIATING GOODS CONVEYED IN RECEPTACLES

[75] Inventor: Ernst Bosshard, Winterthur, Switzerland

[73] Assignee: Sulzer Brothers Limited, Winterthur, Switzerland

[22] Filed: Aug. 28, 1975

[21] Appl. No.: 608,759

[30] Foreign Application Priority Data

Sept. 2, 1974 Switzerland .................... 11877/74

[52] U.S. Cl. ............................... 214/17 B; 99/451; 193/35 A; 193/37; 250/453

[51] Int. Cl.² .......................................... B65G 65/30

[58] Field of Search .......... 214/17 B, 18 R; 99/451; 193/35 A, 37; 250/492 B, 453, 454, 455; 312/97.1, 238

[56] References Cited

UNITED STATES PATENTS

| | | | |
|---|---|---|---|
| 2,607,459 | 8/1952 | Ludwig et al. | 193/37 |
| 2,618,370 | 11/1952 | Orwin | 193/37 |
| 2,848,099 | 8/1958 | Troglione | 214/18 R |
| 3,260,383 | 7/1966 | Gerald | 214/17 B |
| 3,566,113 | 2/1971 | Balanca | 250/453 |

FOREIGN PATENTS OR APPLICATIONS

| | | | |
|---|---|---|---|
| 497,027 | 11/1970 | Switzerland | 214/17 B |

*Primary Examiner*—Trygve M. Blix
*Assistant Examiner*—Stuart M. Goldstein
*Attorney, Agent, or Firm*—Kenyon & Kenyon Reilly Carr & Chapin

[57] ABSTRACT

The turntable in the wall of the irradiation apparatus is provided with two vertically aligned chambers; one to introduce receptacles for irradiation, the other to remove irradiated receptacles. Ejector devices are provided in each chamber of the turntable to act in alternating manner to introduce a receptacle from one turntable chamber into the irradiation chamber or to eject an irradiated receptacle into the removal passage. The turntable can be used with a single-story or multiple-story conveyor system in the irradiation chamber.

8 Claims, 11 Drawing Figures

APPARATUS FOR IRRADIATING GOODS CONVEYED IN RECEPTACLES

This invention relates to an apparatus for irradiating goods conveyed in receptacles.

Heretofore, various types of irradiation plants have been known in which goods are irradiated while being conveyed past a source of radiation. Generally, the goods are placed in receptacles which are then conveyed via various conveyor systems within an irradiation chamber. In some cases, the plants have been constructed with serpentine inlets and outlets to and from the irradiation chamber in order to prevent radiation leakage. In other cases, the walls of the irradiation chamber are made air-tight and a turntable has been mounted in the wall in order to introduce the filled receptacles into the irradiation chamber and to remove the receptacles after irradiation. Such a construction is described in Swiss Pat. Specification No. 497,027 wherein a turntable which allows a compact construction, has a single chamber serving for the introduction and removal of the receptacles. However, in order to cope with receptacle conveyance in a high-output apparatus, either the turntable must be subjected to very considerable forces of acceleration and deceleration or the turntable must have two chambers disposed one beside another. In the latter case, the turntable diameter is increased, and since the space left over must be potted with lead, the turntable not only becomes very heavy but has a high moment of inertia. As a result, for a given output of the apparatus, considerable power is required to drive and retard the turntable.

Accordingly, it is an object of the invention to provide an irradiation plant of the type which uses a turntable to introduce and remove goods-filled receptacles to and from an irradiation chamber wherein the turntable is of reduced weight and has a low moment of inertia.

It is another object of the invention to provide an irradiation apparatus of compact construction which is capable of high output.

It is another object of the invention to provide an irradiation apparatus which can operate at high radiation intensity.

Briefly, the invention provides an apparatus for irradiating goods conveyed in a series of receptacles. The apparatus includes a wall which defines an irradiation chamber, at least in part, a conveyor system within the irradiation chamber for conveying the receptacles past a radiation source in the chamber and a turntable mounted in the wall. In accordance with the invention, the turntable has a pair of chambers which are disposed at different vertical levels one of which is adapted to introduce a receptacle into the irradiation chamber and the other of which is adapted to remove a receptacle from the irradiation chamber.

It is very advantageous to use the turntable in an irradiation apparatus in which the receptacles move past the radiation source on two horizontal planes disposed one above another, for in this case the two vertical levels of the turntable can be in registration with the two planes. In this case, the conveyor system includes two horizontally disposed conveyor paths which are disposed in vertical relation to each other and in registration with the respective chambers in the turntable.

In order to move a receptacle from the turntable, each chamber of the turntable is provided with an ejector means. These two ejector means are operated alternately such that the ejector means in the removal chamber operates when the chamber is in registration with the exterior while the ejector means in the introducing chamber operates when this chamber is in registration with the interior of the irradiation chamber. In addition, the two ejector means can be operated by a common servomotor fixedly mounted outside the turntable.

These and other objects and advantages of the invention will become more apparent from the following detailed description and appended claims taken in conjunction with the accompanying drawings in which:

Figure 1:
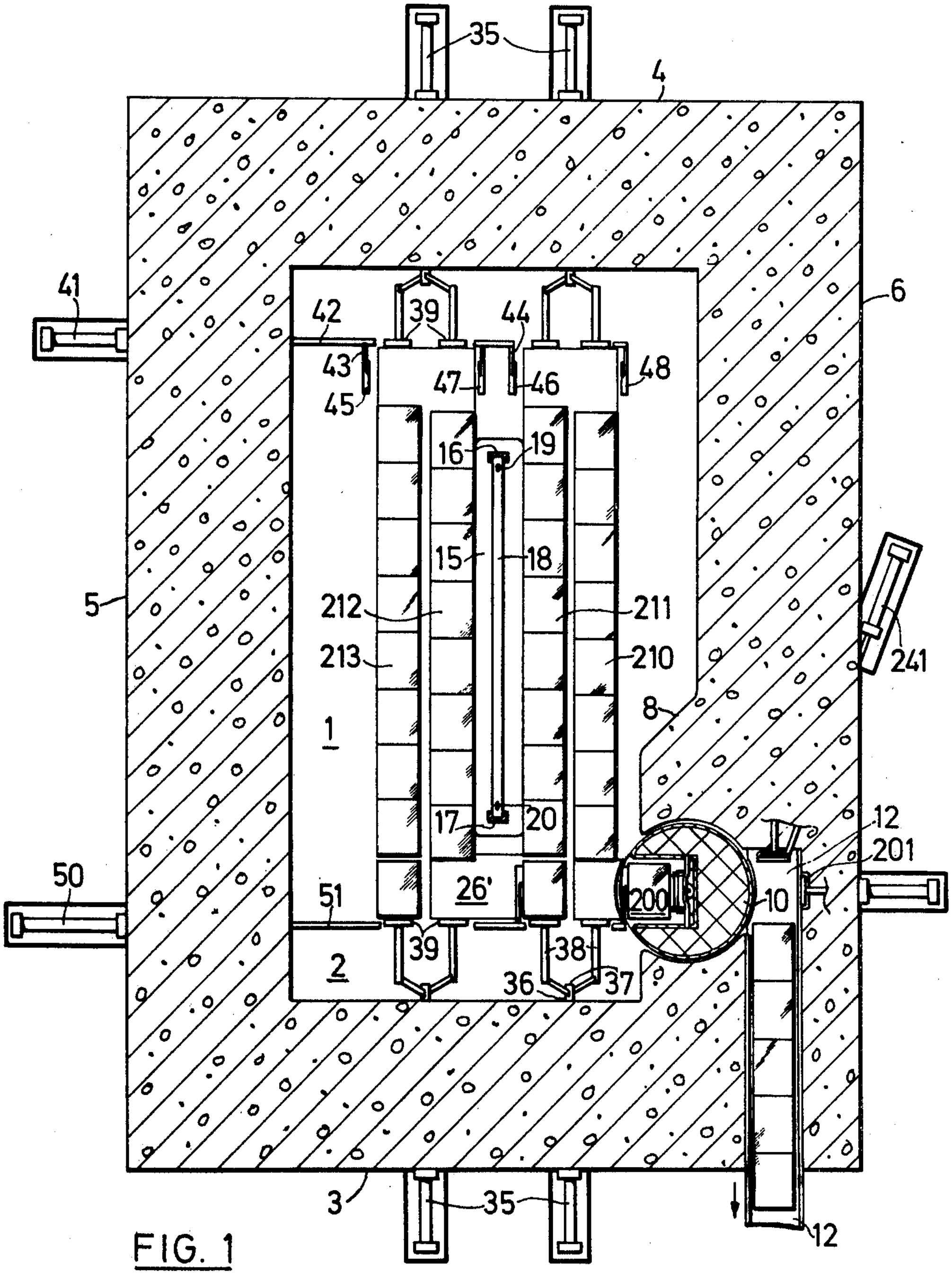
FIG. 1 illustrates a plan view of an irradiation apparatus according to the invention.

Referring to FIGS. 1 to 3 and 5, the irradiation apparatus has an irradiation chamber 1 defined by a base 2, a front wall 3, a back wall 4, side walls 5, 6 and a roof or ceiling 7. One wall 6, the right-hand wall as viewed in FIG. 1, has a thickened portion in which a turntable 10 is mounted on a vertical axis.

Figure 2:
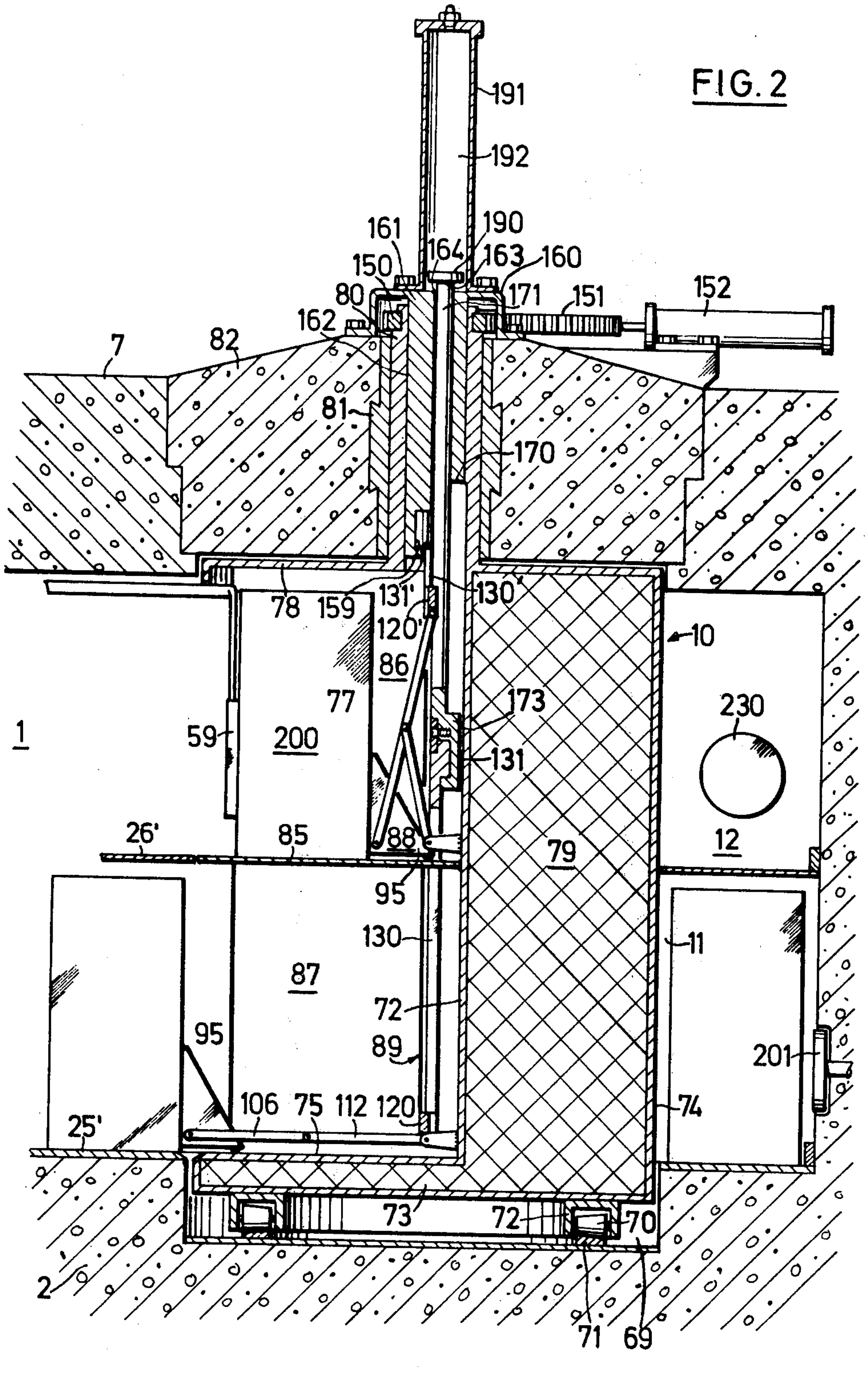
FIG. 2 illustrates a vertical sectional view through the turntable to a scale larger than the scale used in FIG. 1.

As shown in FIGS. 1 and 2, a supply passage 11 for receptacles and a removal passage 12 for irradiated receptacles are formed in the front wall 3 and extend into the side wall 6 in parallel relation to points adjacent to the turntable 10. The passage 11, 12 are arranged in vertical alignment with the supply passage 11 below the removal passage 12.

The central zone of the irradiation chamber 1 is provided with an elongated water basin 15 in which two vertical metal channel-section members 16, 17 are disposed with their open sides facing one another. These members 16, 17 serve to form a guide for a radiation source frame 18 which is suspended on two wire cables 19, 20 for vertical movement. Such an arrangement is described in U.S. Pat. application Ser. No. 599,964 filed July 29, 1975.

Figure 3:
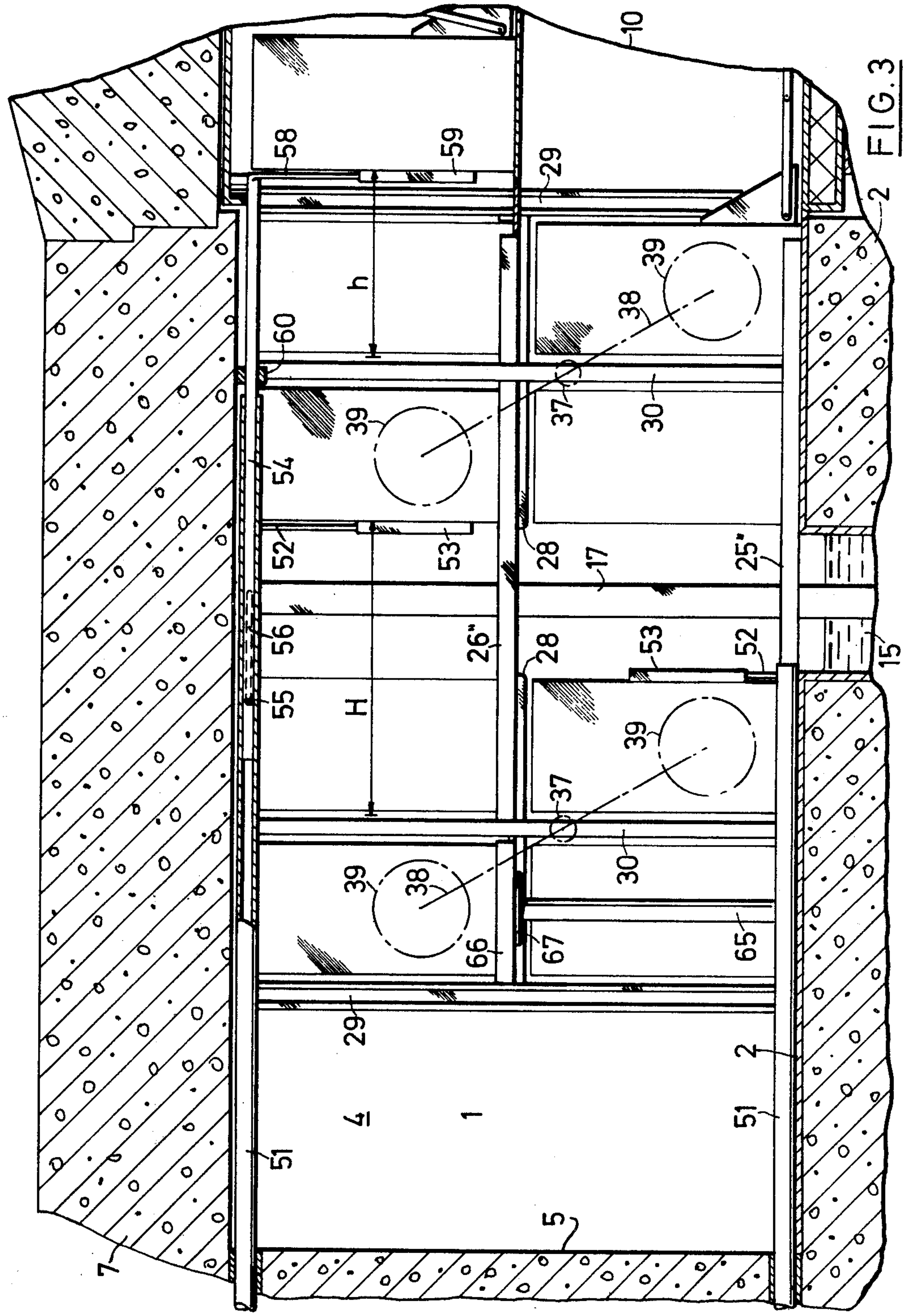
FIG. 3 illustrates a continuation of the vertical section of FIG. 2 through the irradiation chamber.
Figure 5:
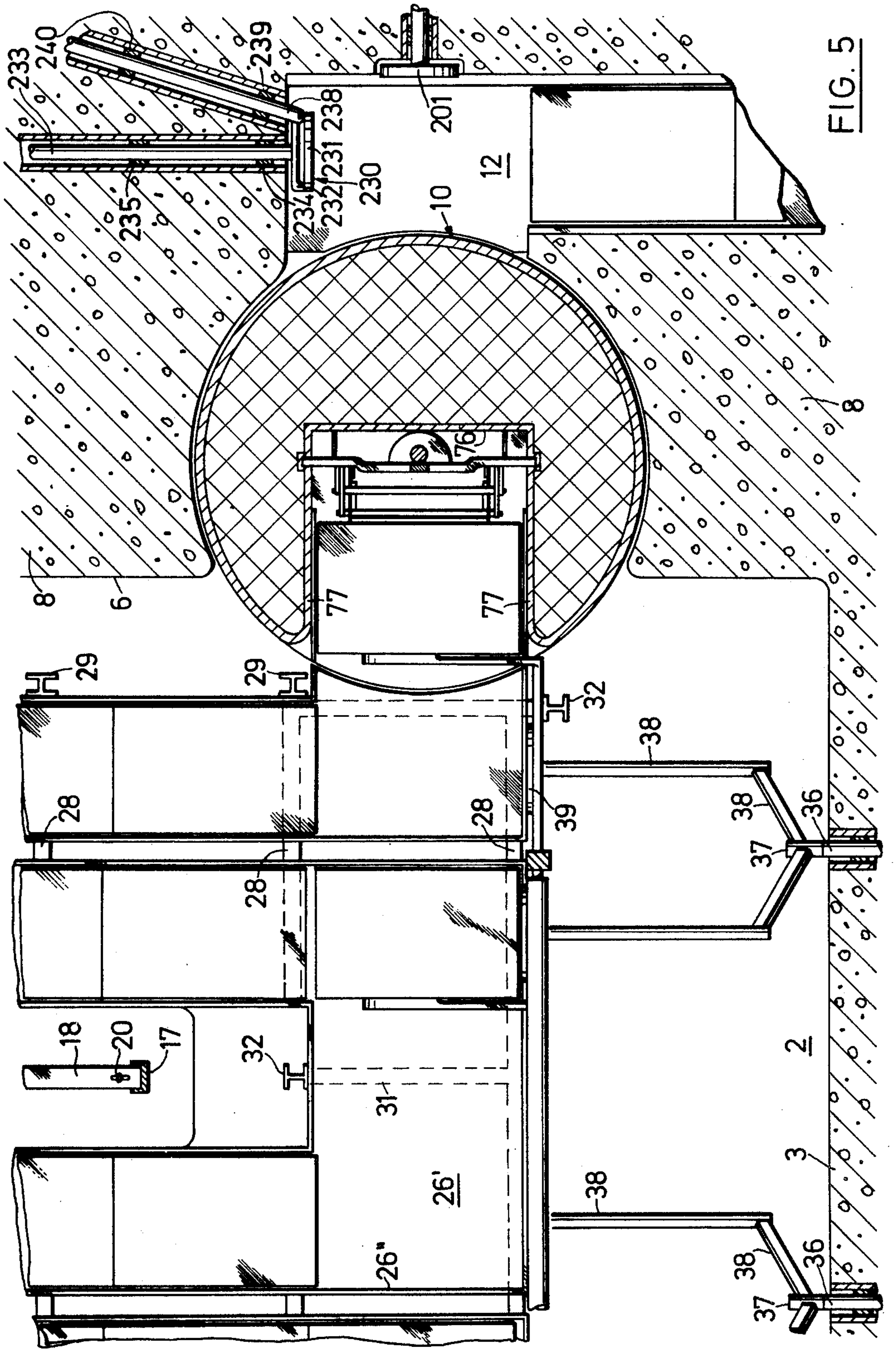
FIG. 5 illustrates a horizontal sectional view through the turntable according to the invention and a portion of the irradiation chamber to the same scale as FIGS. 2 and 3.

Aligned in two horizontal planes and disposed one above another on both sides of the basin 15 are two meandering displacement troughs 25, 26 each comprising a plane base 25', 26' respectively and low metal edgings 25'', 26'' which bound the bases respectively. The bottom troughs 25 rest directly on the irradiation chamber base 2 and the top troughs 26 are mounted on projecting bearers 28 which are secured at one end to vertical I-section pillars 29 and which bear at the other end on light vertical metal supports 30 (FIG. 3). A further support system 31, shown only in FIG. 5, is secured to additional supports 32.

A conveyor system comprising eight pushing elements is provided to move a series of receptacles in the meandering troughs 25, 26. One pair each of double pushing elements extend through the front wall 3 and back wall 4 and each pair comprises a hydraulic servomotor 35, a rod 36 which extends through the shielding wall and a fork head 37 connected to the rod 36 and having two fork rods 38 to the ends of which push discs 39 are secured. Two double displacement members are disposed vertically one above another in the rear part of the left-hand side wall 5 and each comprises a hydraulic servomotor 41 and a push rod 42 which extends through the wall 5. Each push rod 42 has two arms 43, 44 to which displacement plates 45, 46 and 47, 48 respectively are secured. The rods 42 are shown in interrupted form in FIG. 1 in order not to mask the discs 39. Two displacement elements are also disposed vertically one above another in the front part of wall 5 of which the top one carries an extra resilient pushing plate. These elements each comprise a hydraulic servomotor 50 and a rod 51 as can be seen in FIG. 3, in the form of a tube 51. On one arm 52 each of the tubes 51 there is a stationary pushing plate 53. As shown in FIG. 3, a solid rod 54 is introduced into the front of the tube 51 and engages by way of a cross-pin 55 in two diametrically opposite slots 56 in the tube 51. At the free end the rod 54 has an arm 58 which has a push disc 59. The rod 54 is given added guidance by being mounted in a bearing 60 which also forms an abutment for the arm 58. The slots 56 are so contrived that when the plate 53 moves through a distance H, disc 59 moves through a smaller distance *h*.

Referring to FIG. 3, a lifting element is disposed in the irradiation chamber base 2 in the form of a hydraulic servomotor (not shown) a lifting rod 65 and a lifting plate 67 having front and side edgings 66. The servomotor is so adjusted that at the bottom end of its movement, the plate 67 is at the same level as the trough 25, while at the top end of its movement, the plate 67 is at the same level as the trough 26.

Referring to FIG. 2, the turntable 10 is carried on conical rollers 70 running on a conical ring 71 disposed in a cylindrical turntable pit 69. The rollers 70 have short shafts or journals or the like by which they are mounted in a ring 72 having a channel section with the open part facing downwards. A steel casing 74 is mounted on the ring 72 which has the shape, above a low circular cylindrical base part 73, of a circular cylinder over most of its periphery. As shown on the left-hand side in FIG. 2, the casing 74 leaves a substantially square recess which is covered by sheet metal members 75 - 77. The turntable unit terminates at the top in a circular cover plate 78 and the interior of the metal casing 74 has a nonporous lead potting 79. A stub shaft 80 is welded to the cover plate 78 and is guided laterally in a bearing 81 forming part of a mainly concrete cover 82 received in a concentric stepped opening in the irradiation chamber ceiling 7.

A horizontal floor member 85 which registers with the plane floor 26' is disposed about half way up the height of the rectangular recess of the turntable 10, so that a top chamber 86 and a bottom chamber 87 are formed. Each such chamber has an ejector means 88, 89 respectively, ejector 88 being retracted and ejector 89 being extended. A perspective view of the bottom chamber 87 with the ejector means 89 about 75% retracted can be seen in FIG. 4. Each ejector means 88, 89 comprises a pusher plate 90 having a bottom edge 91 and a top edge 92 both bent at right angles. Each plate 90 also has triangular end cheeks 94, 95 which are stiffened by a bottom edge 96. Near the plate 90, the end cheeks 94, 95 have a bottom horizontal rod 100 extending therethrough which is suspended on two levers 105, 106. Spacing collars 101 – 103 are disposed on the rod 100 to opposite sides of the end cheeks 94, 95. Rollers 108, 109 are disposed at the other bottom end of the members 94, 95 which prevent the complete pusher mechanism from tilting over backwards. The levers 105, 106 are carried at pivots 110, 111, halfway along their length by members 112, 113 which are pivotably mounted at their bottom end to members 114, 115. The two members 112, 113 are fixedly interconnected by way of a rod 116 having terminal journals or the like which are engaged in the pivots 110, 111 by way of passages in the levers 105, 106.

The top end of the levers 105, 106 are pivoted to pins 118, 119 of a crosshead 120 which has a double lateral cranked part and whose arms 121, 122 can move vertically in grooves 123, 124 in the members 77.

The cross-head 120 is carried by a vertical rod 130 having a hemi-cylindrical head 131 at the top so connected to the rod 130 to have a median surface 132 in registry with a front surface 133 of the cross-head 120, which the axes of the pins 118, 119 and with the central axes of the grooves 123, 124. The head 131 is formed with a hemicylindrical recess 140 adapted to be engaged by a hemicylindrical part 141 of a retaining member 142.

Figure 4:
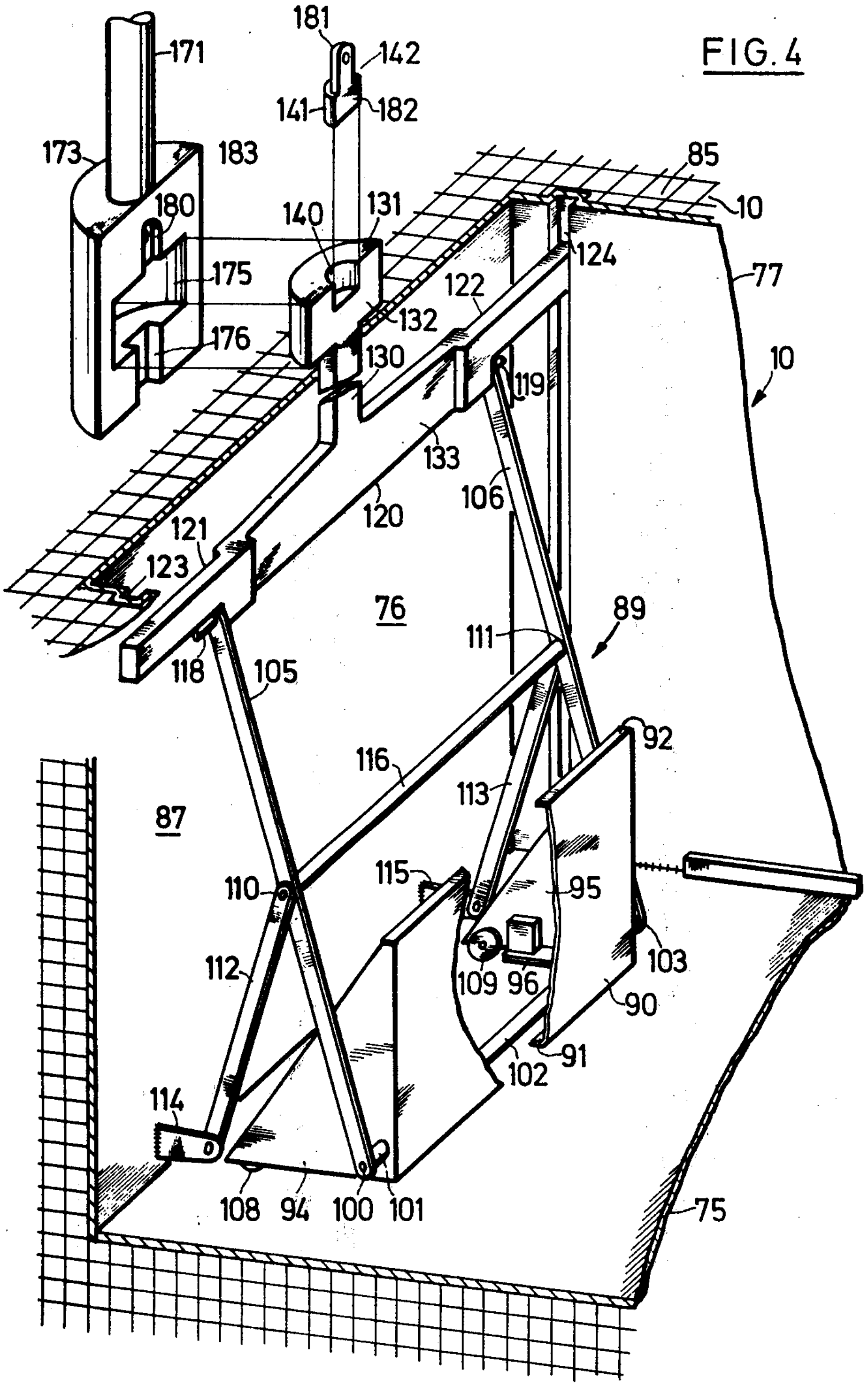
FIG. 4 illustrates a perspective view, to a scale larger than used in FIG. 2, looking from the left on to an ejector means of FIG. 2 in the bottom turntable chamber.

As can be seen in FIG. 4, while the cross-head 120 of the ejector means 89 for the bottom chamber 87 is cranked to the rear so that the associated head 131 is directed towards the rear wall 76 of the chamber 87 from a vertical plane defined by the center-lines of the grooves 123, 124; the cross-head 120' of the top chamber 86 is cranked forwardly and is so associated with a corresponding hemicylindrical head 131' that the two heads 131, 131', when at the same height as one another, together make up a complete circle cylinder with a circle-cylindrical recess for the member 142.

Referring to FIG. 2, a quadrant rack 150 is secured to the top end of the stub 80 and engages a toothed rack 151 driven by a hydraulic servomotor 152 secured to the cover 82. The diameter of the rack 150 and the operative movement of the motor 152 are so adapted to one another that a movement of motor 152 from one operative end position to the other produces a 180° rotation of the turntable 10.

The rack 150 is protected by a cover or cap or the like 160 which is secured to the cover 82 and which has a piston-like part 161 engaging in a central passage 162 in the stub shaft 80. This part 161 has a passage 163, and the generatrix thereof which is on the left in the plane of the drawing lies on the axis of the part 161. The part 161 has a cylindrically relieved portion near the bottom end concentrically of its axis, over a length and of a diameter corresponding to the height and diameter respectively of the two heads 131, 131'. On the side which is on the right in the drawing, the part 161 is reduced by half as far as a plane extending vertically through the axis perpendicularly to the plane of the drawing, the piston or part 161 being left with a horizontal step 170.

An actuating means is provided to actuate the respective ejector means 88, 89 in alternating manner. That is, when the supply chamber 87 is in registry with the lower conveyor path, the ejector means 89 is actuated to eject a receptacle of goods onto the trough 25 while the upper ejector means 88 remains inactive and when the removal chamber 86 is in registry with the removal passage 12, the ejector means 88 is actuated to eject an irradiated receptacle into the removal passage 12 while the lower ejector means 89 remains inactive. To this end, the actuating means includes a rod 171 which is slidably mounted in the passage 163 and which has a receiving head 173 at the lower end as shown in FIGS. 2 and 4. The receiving head 173 is formed with a hemicylindrical recess 175 and with a groove 176 adapted to receive the rod 130. A recess 180 is disposed above the recess 175, contrived by turning, in which an extension 181 of the member 142 can be received and which can be so secured by means of a screw (not shown) that the median plane 182 of member 142 is flush with the median plane 183 of the head 173.

When the rod 171 is raised until head 173 abuts step 170, the recesses 175 and 159 cooperate to bound a completely cylindrical chamber in which the two heads 131, 131' are disposed one beside another.

The actuating means also includes a servomotor piston 190 at the top of the rod 171 which extends into a cylinder 191 of a double-acting hydraulic servomotor 192.

The turntable 10 operates as follows:

When the piston 190 is at the top end position of its operative movement, the head 173 is in engagement with the abutment 170 and the two heads 131, 131' are disposed in the coregistering recesses 175, 159. The rods 130', 130 connecting the heads 131', 131 to the cross-heads 120', 120 differ in length from one another and are just long enough for the two ejector means 88, 89 to be in the fully retracted position - i.e., the position of the ejector means 88 for the top removal chamber 86 in FIG. 2. When the piston of the servomotor 152 is in the extreme right end position of its operative movement, the turntable 10 is in the position shown in FIG. 2. Means (not shown) allow the servomotor 192 to be operated when the system is in this position, and a special pulse from an automatic control facility (not shown) moves the piston 190 down into the required position; in this movement, the head 173 which is secured to rod 171 pushes the head 131 with the rod 130 and the cross-head 120 downwardly so that the levers 105, 106 which are coupled with the members 112, 113 scissor out to the left and push the plate 90 to the left (in FIG. 2). The head 131 meanwhile remains secured in the recess 175, being prevented from disengaging laterally therefrom by the member 142. The head 131' is kept secured in the recess 159 by the rod 130.

When the piston 190 returns to its top end position, the ejector means 89 of the bottom chamber 87 is pulled in. At the conclusion of this movement, a blocking (not shown) of the servomotor 152 is cleared and the servomotor 152 can be operated to rotate the turntable 10 through 180° into the position in which the chamber 86 is near the supply passage 11 and the chamber 87 is near the removal passage 12.

Once the turntable 10 has reached this position, the servomotor 152 ceases to operate and the blocking of servomotor 192 is cleared. When the servomotor 192 is operated again, the rod 171 with the head 173 descends, but this time the head 131' of the ejector means 88 associated with the chamber 86 is in the hemicylindrical recess 175 while the head 131 of the ejector means 89 for the bottom chamber 87 remains secured in the recess 159. In this position, therefore, only the top ejector means 88 operates. While ejection is proceeding in respect of chamber 86 or 87, a receptacle 200 can simultaneously be introduced into the other chamber 87 or 86. This purpose is fulfilled by the push disc 59 in the irradiation chamber and a push disc 201 which is associated with the supply passage 11 and which is disposed opposite the turntable 10.

Figure 6:
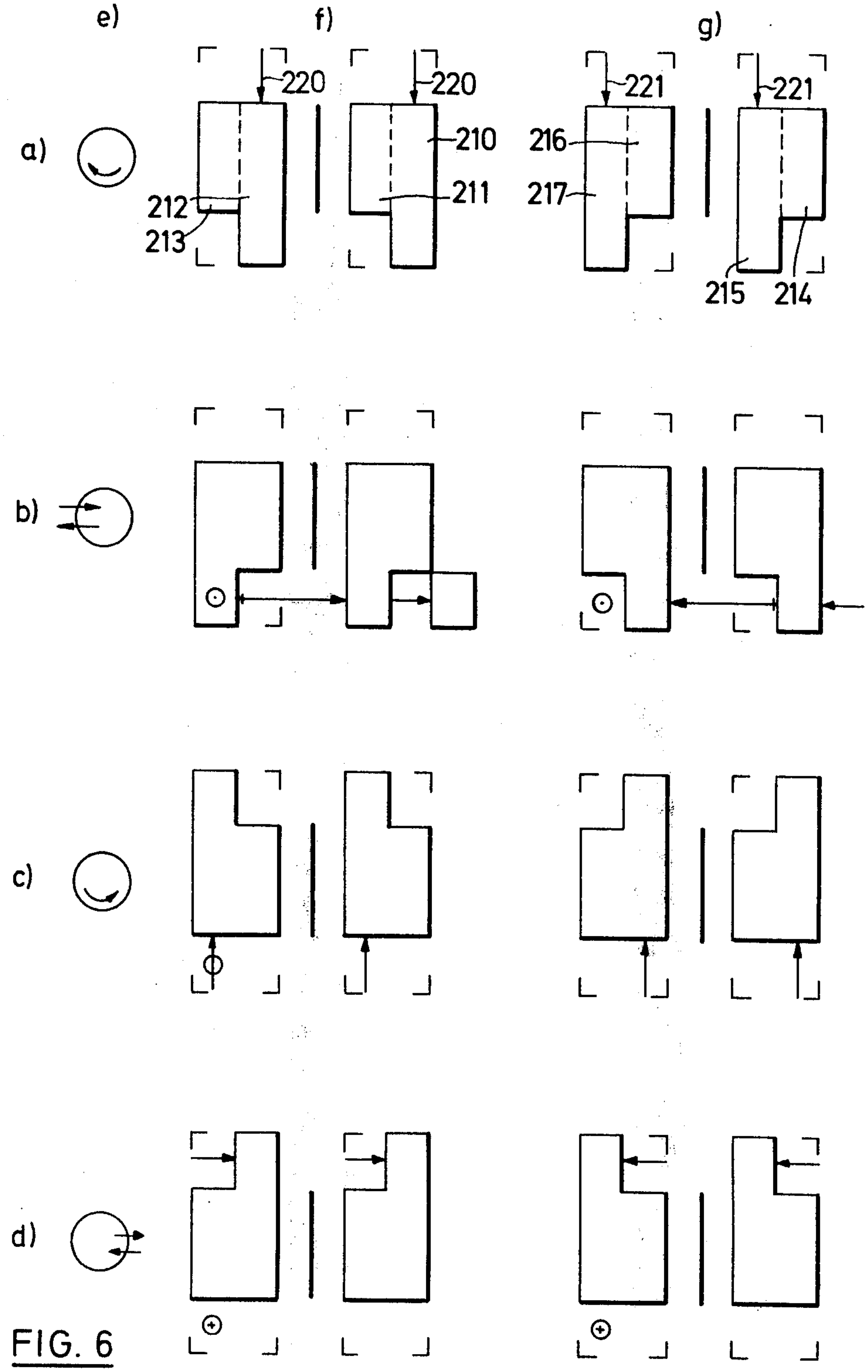
FIG. 6 illustrates a movement diagram in accordance with the invention showing the rhythm of the movement of the receptacles on the two vertical levels or stories of the irradiation chamber in connection with turntable position.

As is shown diagrammatically in FIG. 6, the receptacles are conveyed on a "four-stroke" basis, the four strokes corresponding to the four lines (*a*) to (*d*), the operation of the turntable is indicated in column (*e*), the displacements made in the top level or story of the irradiation chamber are indicated in column (*f*) and the displacements made in the bottom story or level are indicated in column (*g*).

During stroke *a*), the turntable 10 is turned into the position shown in FIGS. 1, 2 and 5. Also, the rear servomotors 35 advance receptacle rows 210, 212 in the top troughs 26 and receptacle rows 215, 217 in the bottom troughs 25, the amount of this advance being the length of a receptacle. This advance is indicated by arrows 220 and 221 in columns (*f*) and (*g*) respectively of row (*a*).

In stroke (*b*), and can be seen in column (*e*), a receptacle 200 containing irradiated goods or material is pushed into the top chamber 86 of the turntable 10 while from the bottom story - i.e., the bottom chamber 87, a receptacle containing material for irradiation is ejected into the radiation chamber 1. As can be gathered from column (*f*), the rod 54 simultaneously raises a receptacle from the bottom story into the top story; also, the top of the two servomotors 50 disposed laterally at the front acts by way of the pusher plate 53 to slide a receptacle from row 212 into alignment with row 211, simultaneously as the associated disc 59 ejects a receptacle from row 210, as already indicated, into the turntable top chamber 86. As can be gathered from line (*b*), column (*g*), the ejector means 89 acts at the same cadence in the bottom story to push a receptacle from the bottom chamber 87 into alignment with the receptacle row 214 while the bottom of the two servomotors 50 pulls in its rod 51 and thus moves a receptacle from row 215 into row 216.

In stroke (*c*) the piston of the servomotor 152 moves into its left-hand end position, the turntable 10 rotating through 180° anticlockwise. Also in stroke (*c*), the servomotors 35 disposed on the front wall move the receptacles of the rows 211, 213 and 214, 216 rearwardly by an amount corresponding to the length of one receptacle to release the lifting plate 67.

In stroke (*d*), and as indicated in column (*e*), the receptacle containing irradiated material is ejected from the turntable top chamber 86 into the top removal passage 12 while the pusher disc 201 introduces a receptacle containing non-irradiated material from the bottom supply passage 11 into the bottom turntable chamber 87. In the same stroke, column (*f*), the rod 65 descends so that the empty disc or plate or the like 69 returns to the level of the floor 25'; simultaneously, the top of the two servomotors 41 acts by way of the plates 45, 46 to push one receptacle each from the rows 211, 213 into alignment with the rows 210, 212. According to column (*g*), displacement plates or discs 47, 48 which are associated with the bottom of the two servomotors 41 simultaneously move one receptacle each from rows 214, 216 into rows 215, and 217 respectively. Stroke (*d*) is followed by (*a*) and so on.

While means (not shown) refill the supply passage 11 with a fresh receptacle after ejection of the front receptacle, a ram or the like 230 in the removal passage 12 removes the receptacles which have been ejected from the turntable 10. The member 230 comprises a disc 231 having a stirrup-shaped member 232 on the back to which a guide rod 233 is welded. This rod 233 is guided in two bearings 234, 235 and is secured therein against rotation by means which are not shown. A roller secured to the end of a rod 238 engages between the disc 231 and the stirrupt 232. The rod 238 extends at an acute angle to the rod 233 and is guided in two bearings 239, 240 with provision for preventing rotation, and is driven by a servomotor 241.

As already stated, the various servomotors are controlled by a central automatic control system, a stroke being possible only when return-information elements (not shown) have indicated that the preceding movement has been completed properly. If the corresponding return information fails to reach the automatic control system at the proper time, the frame 18 is automatically introduced into the water basin 15 and a warning given.

Figure 7:
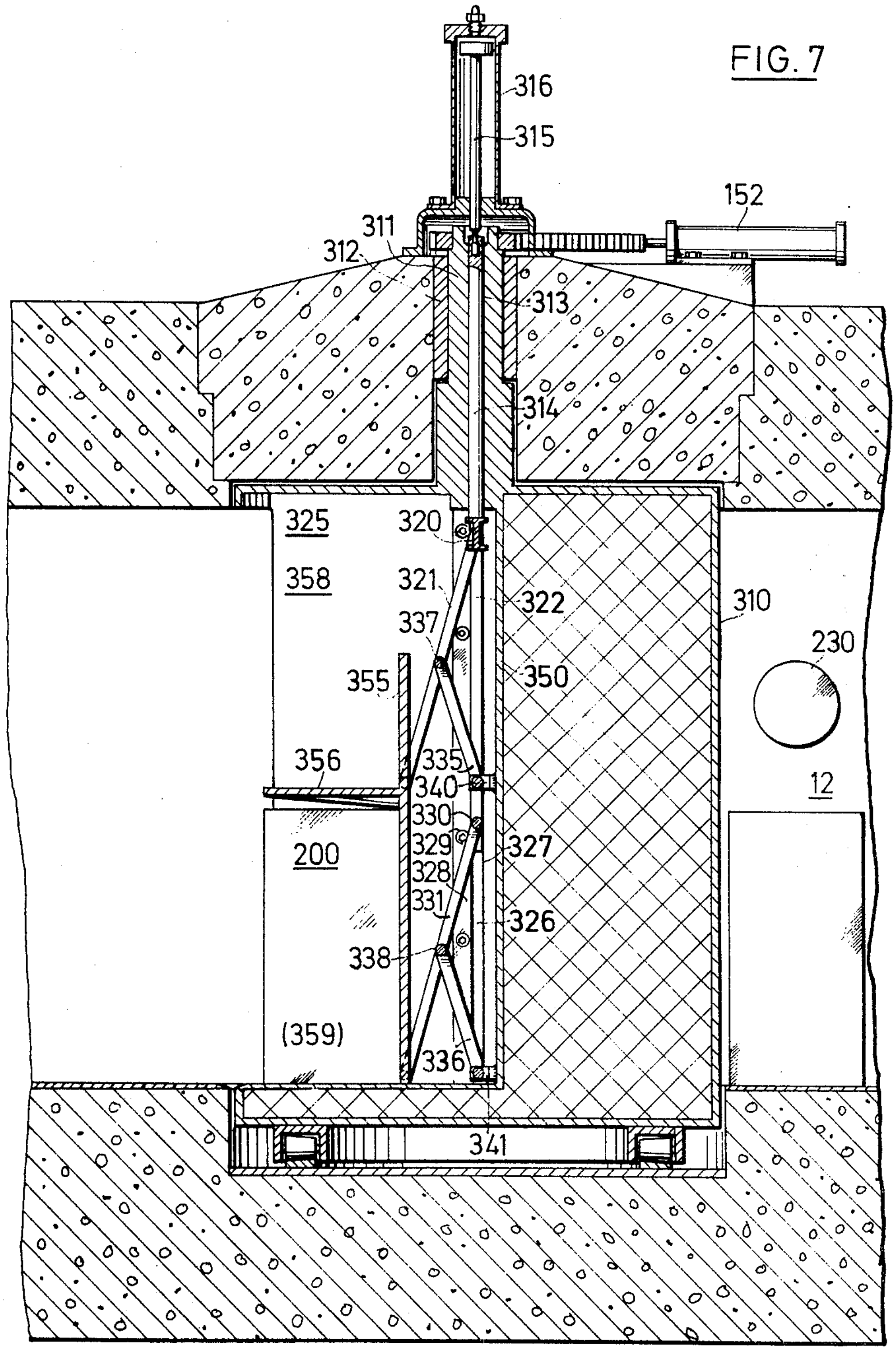
FIG. 7 illustrates a vertical sectional view through a modified turntable according to the invention to the same scale as in FIG. 2.
Figure 8:
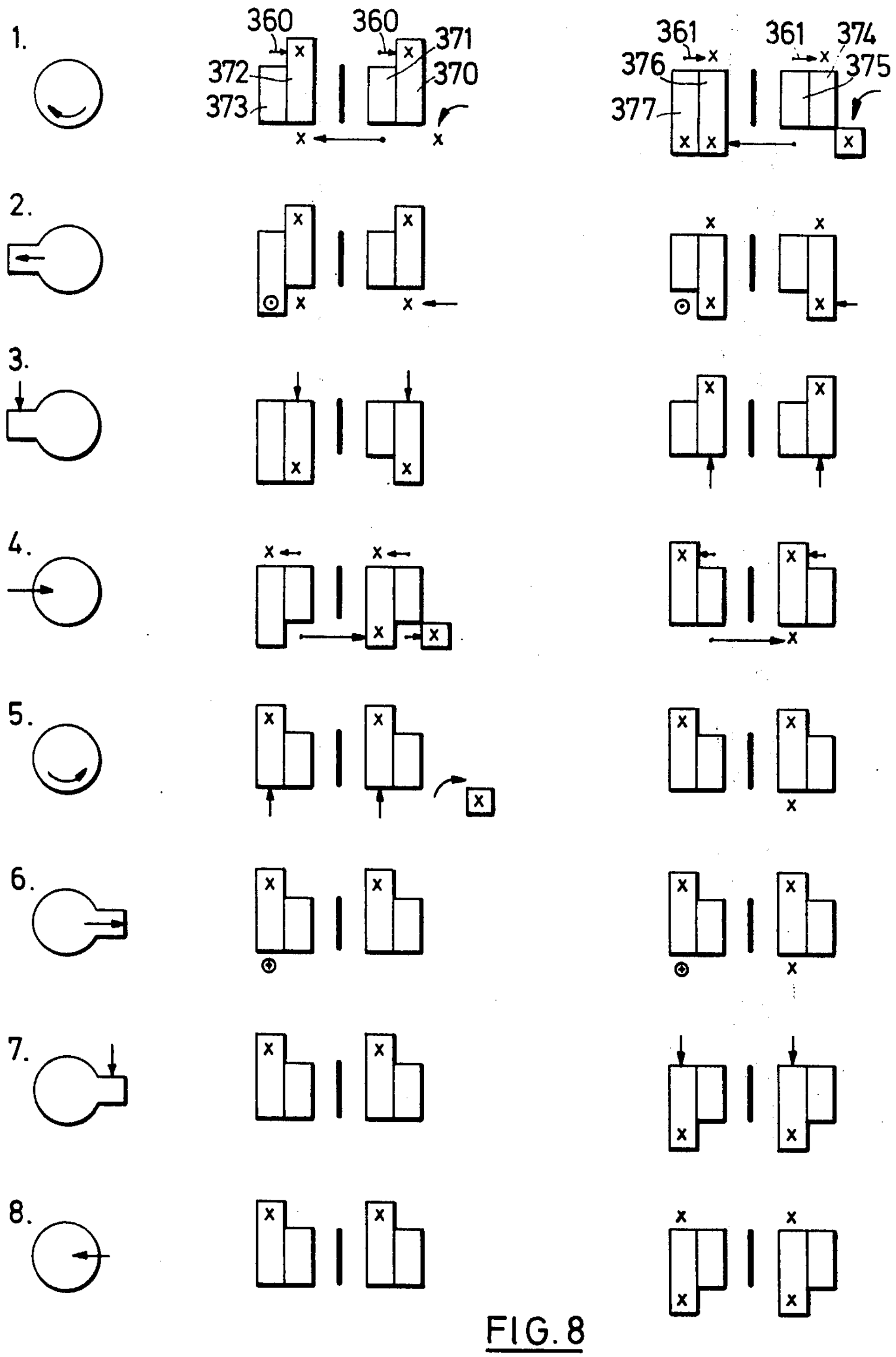
FIG. 8 illustrates a movement diagram associated with FIG. 7.

The first embodiment which has been described in the foregoing is intended for maximum throughput, a concept apparent from the fact that the movement program has only four phases and so takes up little time, but the second embodiment is constructed to use a reduced number of servomotors. In this case, the receptacle movement program is in an eight-phase rhythm which is shown in FIG. 8. As FIG. 7 shows, the ejection mechanism for the turntable 310 is considerably simpler than for the turntable 10. Most of turntable 310 is identical in construction to the turntable 10 and a top stub shaft 311 is guided in a bearing 312 in a manner similar to the embodiment shown in FIG. 2; however, stub shaft 311 has a central passage 313 in which a push rod 314 is directly mounted for axial movement. At the top end the rod 314 is rotatably coupled with the bottom end of a thrust rod 315 of a hydraulic servomotor 316. At the bottom end, the rod 314 supports a cross-head 320 having pins (not shown) at both ends which extend along the cross-head axis. The pins engage first in apertures in the top ends of one lever 321 each and also engage in apertures in the ends of one bar 322 each and terminate flush with the bars 322. The two bars 322 are mounted for lengthwise movement in two grooves 326 in two lateral surfaces 325. The grooves 326 are contrived by one offset 327 each of wall 325 and by retaining bars 328 which screws 329 secure to the walls 325. There is a horizontal rod 330 having pin-like ends near the bottom end of the bars 322. Both such ends engage first in bores in the top ends of levers 331 and then in bores which are near the bottom end of the bars 322. As measured between the places where the rod 330 is engaged by the two pins, the rod 330 is of the same length as the cross-head 320 and thus ensures that the bars 322 cannot disengage from the grooves 326. Halfway along their length, four levers 321, 331 are carried by members 335, 336 respectively each connected by a horizontal rod 337, 338 to from a rigid U.

The bottom ends of the four members or links or the like 335, 336 are carried at four bearing places 340, 341 which project from the rear wall 350. At their bottom ends, the levers 321, 331 are formed with apertures receiving four dowels contrived on the narrow sides of a pusher plate 355 which extends parallel to the rear wall 350. A horizontal shelf 356 is mounted on the plate 355 which serves as the floor or base of a top chamber 358 and separates the top chamber 358 from a bottom chamber 369.

The turntable mechanism is of identical construction to that used in the embodiment of FIG. 2.

The pusher facility shown in FIG. 7 operates as follows:

When the turntable rotates, the servomotor 316, which is secured by elements (not shown) is in a top end position, and so the components 321, 331 and 335, 336 with the plate 355 and member 356 are in the position shown. When the chambers 360, 361 are in a position in which they are oriented towards the interior of the irradiation chamber and when the turntable 310 has been locked in this position, the automatic control mechanism can operate to lower the piston of the servomotor 316. The plate 355 therefore ejects the receptacle 200 in the bottom chamber 359 simultaneously, member 356 moves into the adjacent row of receptacles. When this row has been advanced axially by a distance corresponding to the length of one receptacle, a receptacle is slid onto the member 356. In the next movement, the plate 355, with the receptacle on the member 356, is drawn in, the servomotor 316 is blocked and the blocking of the servomotor 152 which rotates the mechanism is released. After the turntable has rotated through 180°, the motor 152 is blocked again and the blocking of motor 316 is released. When the motor 316 now makes a rising movement, the receptacle containing irradiated material moved on the floor or shelft 356 into the removal passage 12 when the ram 230 transfers the receptacle from the floor 356 to the adjacent floor of the passage 12. In the next movement phase, the servomotor 316 returns to the top end position, the disc 201 simultaneously introducing into the chamber 361 a receptacle which contains non-irradiated material. The turntable is therefore ready for further rotation.

In contrast to the first embodiment, receptacles are not transferred between adjacent rows by moving along a transverse path of the shifting or displacing through; instead of such paths, frames are provided which resemble dumb waiters and which are charged as a result of the associated rows being moved lengthwise. Thereafter, the frames are transversely of the rows, whereafter the receptacles are ejected from the transfer frames towards the adjacent rows. These rolling transfer frames have two levels or stories adapted to be charged one at a time alternately. In the diagram shown in FIG. 8, available places in the transfer frames are indicated by the letter *x*. The movement pattern in the second embodiment is as follows:

In the first movement phase, corresponding to the first line of FIG. 8, the turntable 310 rotates so that the opening opens to the irradiation chamber. Simultaneously, the rear transfer frame, which has two receptacles in the top story and an empty bottom story, moves to the right as indicated by arrows 360 and 361 so that the receptacles in the transfer frame come into alignment with receptacle rows 370, 372. Consequently, the empty places *x* in the frame bottom story are moved into alignment with the rows 374, 376. In the same movement phase, the front transfer frame, which has one receptacle in the bottom story and an empty top story, is moved from row 375 into alignment with row 376.

In a second movement phase, the plate 355 is extended from the turntable 310 to move the receptacle on the floor 356 into alignment with the row 374; simultaneously, the rod 65 rises to bring the receptacle thereon into alignment with row 373.

In a third movement phase, two rear pusher plates driven by a common servomotor move the rows 370, 372 forward by an amount corresponding to the length of one receptacle while in the bottom story a servomotor disposed in the front of the mechanism operates plates which move the rows 374, 376 back by the same amount. In this advance of the row 370, the front receptacle is pushed on to the floor or shelf 356 which still extends into the irradiation chamber.

In a fourth movement phase, the plate 355 with the receptacle on the floor or shelf 356 is drawn into the turntable; simultaneously, the rear transfer frame moves to the left and the front transfer frame to the right. Consequently, in the bottom story one receptacle each from rows 374, 376 is moved into rows 376, 377 respectively while in the top story a receptacle is transferred from the front of row 372 into row 371.

In a fifth movement phase, the turntable 310 rotates through 180° so that the opening is distal from the irradiation chamber. Simultaneously, two pusher plates which are disposed at the front of the top story and which are operated via a common servomotor push the rows 371, 373 back by an amount corresponding to the length of one receptacle.

In a sixth movement phase, the plate 355 with the floor or shelf 356 and the receptacle thereon move out of the turntable 310.

In a seventh movement phase, the ram 230 clears the receptacle containing the irradiated material off the shelf 356; simultaneously, two pusher plates which are also operated by a common servomotor act in the bottom story of the irradiation chamber to advance the rows 375, 377 by an amount corresponding to the length of one receptacle.

In an eighth and final movement phase, the plate 35 is drawn into the turntable simultaneously as pusher disc 201 introduces a receptacle containing non-irradiated material from the supply passage 11 into the turntable bottom chamber 359. The system has therefore returned to the starting position for the first movement phase.

The turntable according to the invention has been depicted in the foregoing as being part of a two-story irradiation apparatus. However, the advantages of the turntable which has been mentioned at the beginning are not impaired by the turntable being used in a single-story irradiation apparatus. Such a use may be practical when a later extension toward a two-level irradiation apparatus has been planned at the beginning or might prove itself probably necessary in the near future. With a one-story irradiation apparatus, provisions have to be made to ensure that the receptacles which are introduced into the irradiation chamber via the top story of the turntable can move to the lower level of the displacing troughs in the irradiation chamber, for instance, by installing a conveyor for the receptacles. Removal from the irradiation chamber is by way of the bottom story of the turntable which is at the same level as the plane of irradiation.

As an alternative, the receptacles may be introduced into the irradiation chamber through the lower story of the turntable and lifted, after irradiation, by means of a conveyor to the top story of the turntable and subsequently removed from the irradiation chamber.

Figure 9:
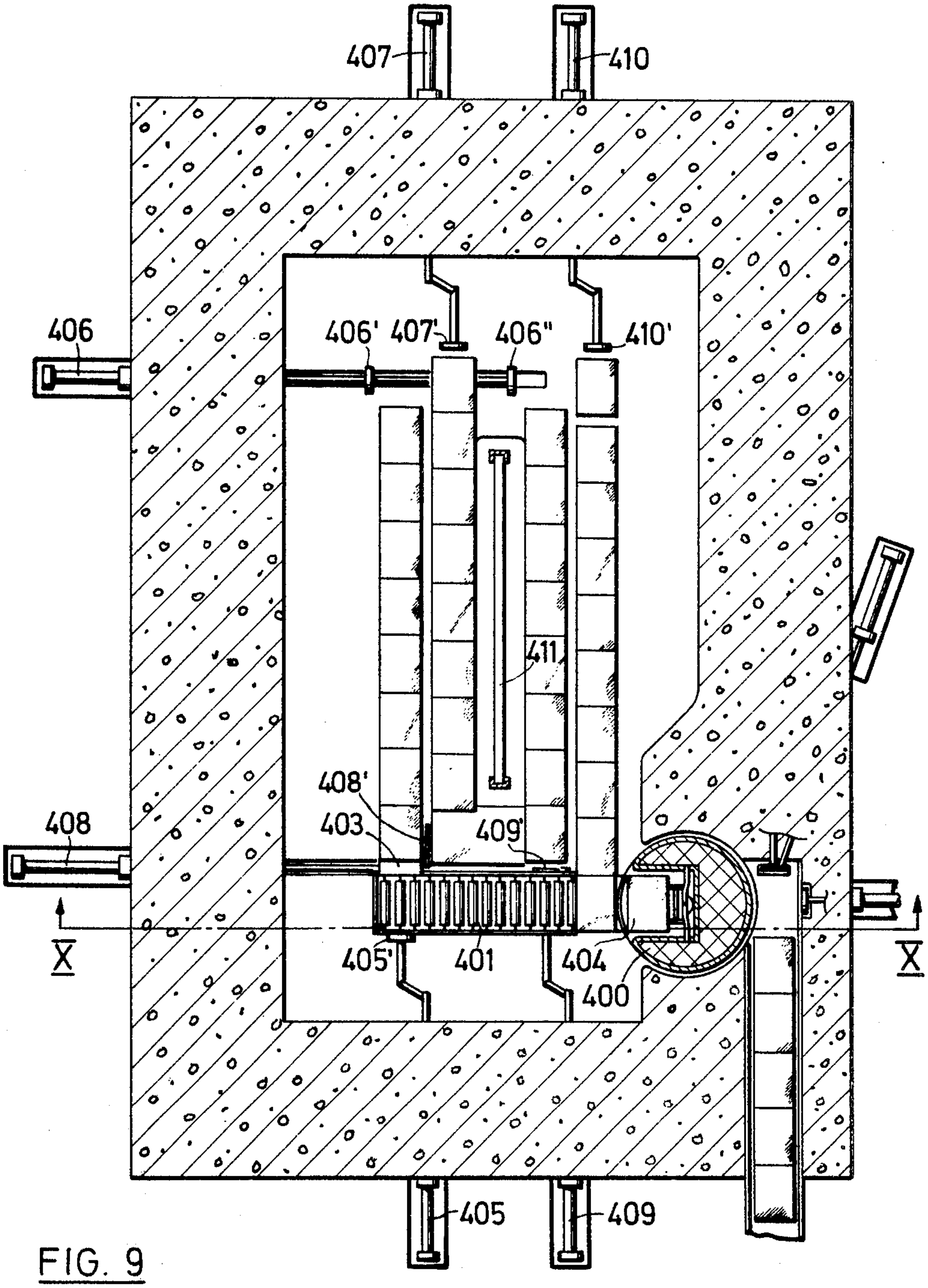
FIG. 9 illustrates a plan view of an irradiation apparatus having a one-story construction according to the invention.
Figure 11:
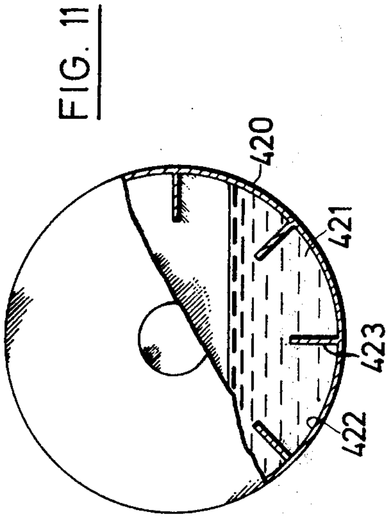
FIG. 11 illustrates a sectional view through a roller of the conveyor shown in FIG. 10.
Figure 10:
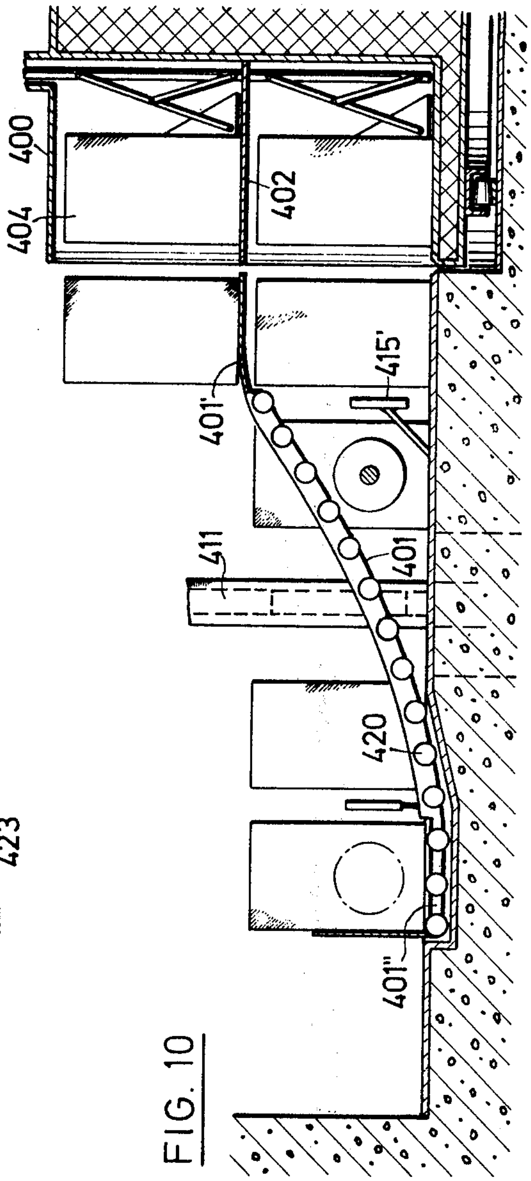
FIG. 10 illustrates a view taken on line X—X of FIG. 9.

According to FIGS. 9 and 10, a one-story irradiation apparatus is provided with a two-story turntable 400 and a roller conveyor 401. The upper end 401′ of the conveyor registers with a bottom 402 about halfway up the height of the turntable. The lower end 401″ of the conveyor terminates before a displacing trough 403 near the bottom of the irradiation chamber. A receptacle 404 with material to be irradiated is ejected from the upper story of the turntable 400 in a manner already described onto the conveyor to slide down the conveyor and arrive before the displacing trough 403. From there, the receptacles are moved in the manner already described around the radiation source frame 411, finally arriving underneath the conveyor by means of servomotors with pertaining pushing discs 405 resp. 405′, 406 resp. 406′, 407 resp. 407′, 408 resp. 408′, 409 resp. 409′, 406 resp. 406′. From this point of arrival, the receptacles are pushed into the lower story of the turntable 400 by means of a servomotor (not shown) installed in the bottom of the irradiation chamber with a pushing disc 415′. After rotation of the turntable 400, the receptacles are removed therefrom and from the irradiation apparatus.

In order to be able to brake the receptacles when sliding down the conveyor, the rollers 420 of the conveyor are hollow and are filled partially with a liquid such as water 421 and are provided with radial ribs 423 on their inner wall. When the rollers 420 rotate, the ribs 423 experience a resistance in the water, braking themselves and preventing them from exceeding a derived speed of rotation.

Although reference has been made in the foregoing to receptacles filled with a material to be irradiated, such material can, if required, pass through the irradiation apparatus as piece goods.

What is claimed is:

1. An apparatus for irradiating goods conveyed in a series of receptacles, said apparatus comprising a wall defining an irradiation chamber in part;

a conveyor system within said irradiation chamber for conveying the receptacles past a radiation source in said chamber; and a turntable mounted in said wall, said turntable having a pair of chambers disposed at different vertical levels therein, one of said chambers being adapted to introduce a receptacle into said irradiation chamber and the other of said vertically spaced chambers being adapted to remove a receptacle from said irradiation chamber.

2. An apparatus as set forth in claim 1 wherein said conveyor system includes two horizontally disposed conveyor paths, said paths being disposed in vertical relation to each other, and each path being in registration with a respective one of said chambers in said turntable.

3. An apparatus as set forth in claim 1 wherein said chambers are disposed in vertical alignment with each other.

4. An apparatus as set forth in claim 1 which further comprises a pair of ejector means, each said ejector means being located in one of said chambers of said turntable for ejecting a receptacle therefrom.

5. An apparatus as set forth in claim 4 which further comprises an actuating means for actuating said pair of ejector means in alternating manner.

6. An apparatus as set forth in claim 5 wherein said actuating means includes a common servomotor mounted outside said turntable for actuating each ejector means.

7. An apparatus as set forth in claim 1 wherein said conveyor system has a conveyor sloping down from the upper chamber of said turntable towards the bottom of said irradiation chamber.

8. An apparatus as set forth in claim 7 wherein said conveyor includes a plurality of hollow rollers filled partially with liquid and having radial ribs therein for immersion in the liquid during rotation of said rollers.

* * * * *